United States Patent [19]

Walters et al.

[11] Patent Number: 4,501,780
[45] Date of Patent: Feb. 26, 1985

[54] TUBULAR FILM HAVING SEALING LAYER OF PROPYLENE ETHYLENE RANDOM COPOLYMER

[75] Inventors: Johnnie J. Walters, Greer, S.C.; Philip T. Voso, Tryon, N.C.; Karl N. Caldwell, Norcross, Ga.

[73] Assignee: W. R. Grace & Co., Cryovac Div., Duncan, S.C.

[21] Appl. No.: 449,895

[22] Filed: Dec. 15, 1982

[51] Int. Cl.$^3$ ............................................. B65D 65/00
[52] U.S. Cl. .................................... 428/35; 206/432; 383/113; 383/908; 428/520
[58] Field of Search ................. 206/432; 383/113, 908; 428/520, 35; 156/244.17, 272.2, 273.3; 264/209.1

[56] References Cited

U.S. PATENT DOCUMENTS

| | | | |
|---|---|---|---|
| 3,741,253 | 6/1973 | Brax et al. | 428/520 |
| 4,044,187 | 8/1977 | Kremkau | 428/520 |
| 4,194,039 | 3/1980 | Mueller | 428/520 |
| 4,207,363 | 6/1980 | Lustig et al. | 428/35 |
| 4,235,365 | 11/1980 | Yoshii et al. | 428/35 |
| 4,276,330 | 6/1981 | Stanley et al. | 428/35 |
| 4,352,844 | 10/1982 | Bornstein | 428/520 |
| 4,352,849 | 10/1982 | Mueller | 428/520 |
| 4,391,862 | 7/1983 | Bornstein | 428/35 |

*Primary Examiner*—John E. Kittle
*Assistant Examiner*—James J. Seidleck
*Attorney, Agent, or Firm*—John J. Toney; William D. Lee, Jr.; Mark B. Quatt

[57] ABSTRACT

A heat sealing layer is provided for multiply tubular film preferably of the type having an inner shrink layer of an irradiatively cross-linked ethylene vinyl acetate copolymer, a core barrier layer of vinylidene chloride-vinyl chloride copolymer, and an outer abuse layer of an ethylene vinyl acetate copolymer, the sealing layer being melt bonded onto the shrink layer and being composed of a propylene ethylene random copolymer. Heat seals formed in making bags from the improved film demonstrate enhanced high temperature strength and grease resistance. An associated method for making the tubular film is also provided.

5 Claims, No Drawings

TUBULAR FILM HAVING SEALING LAYER OF PROPYLENE ETHYLENE RANDOM COPOLYMER

BACKGROUND OF THE INVENTION

This invention relates generally to heat shrinkable thermoplastic packaging film which can be heat sealed to itself to form a flexible package. The invention relates more particularly to multilayer tubular film of ethylene vinyl acetate copolymeric material having a sealing layer that is not adversely effected during irradiative treatment.

A heat shrinkable, tubular packaging film which has enjoyed considerable commercial success for making bags having low gas transmission is described in U.S. Pat. No. 3,741,253 issued June 26, 1973 to Brax et al. One preferred film in the Brax patent may be produced by extruding a tubular substrate layer of ethylene vinyl acetate copolymer and then flatting the tube and moving it in a series of passes through an electron beam to cross-link the molecules of the copolymer to facilitate orienting. Next, the film is inflated, but not substantially stretched, and passed through an annular coating die where it receives a second or barrier layer which comprises saran being a copolymer of vinylidene chloride-vinyl chloride. Irradiation must be conducted prior to the application of the saran barrier layer since irradiation renders saran unacceptable for use in food packaging applications. This two layer tube then passes through another annular die in which it receives a coating of ethylene vinyl acetate copolymer. The tube at that point having a wall of three polymeric layers is cooled, collapsed, and fed through a hot water bath where the tube is sufficiently softened so that it can be inflated into a bubble and stretched while engaging between two spaced apart pairs of pinch rollers. The inflation causes the tubing to be thinned as it is stretched into film, and as the bubble leaves the hot water bath it cools quickly in air and becomes oriented. After the bubble is collapsed, the film is wound up as flattened, seamless, tubular film to be later used to make bags, e.g. either end-seal bags which are typically made by transversely heat sealing across the width of flattened tubing followed by severing the tubing so that the transverse seal forms the bottom of a bag, or side-seal bags in which the transverse seals form the sides and one edge of the collapsed tubing forms the bottom of the bags.

In making bags in a rapid commercial operation wherein the flattened tubing walls are pressed together with heated seal bars, the dwell time of the seal bars should be as short as possible yet sufficiently long to fuse and bond the inside surface layer of the tube to itself in a smooth, continuous, strong seal. At rapid speeds the seals do not have time to set-up, and the tension when transporting the tubing can cause the seals to pull apart. Intermittent motion is necessary as bags are moved to and from the seal station as there must be a time when the tubing is stopped while the transverse seals are made. At a high bag making rate if the seals are not strong, the force due to the acceleration of the leading bag to advance the next bag into the seal station will cause the newly formed seals to be pulled apart as the seals are still warm. Conventional practice provides for adjustment of bag making rate to allow the seal to cool sufficiently. It is an object of the present invention to provide a film which will have strong seals at relatively high bag making rates.

The importance of a strong reliable seal further applies during use of such bags. This type of bag is primarily used to package a large variety of fresh and processed meats typically by placing the meat in the bag, evacuating the bag, gathering and applying a metal clip around the gathered mouth of the bag to hermetically seal it, and then immersing the bag in a hot water bath at approximately the same temperature at which the film was stretch-oriented. This temperature is typically in the range of 160° to 205° F. Hot water immersion is one of the quickest and most economical means of transferring sufficient heat to the film to shrink it uniformly. Thus, it is essential that heat seal integrity be maintained during shrinkage of the bag at elevated temperatures.

Attempts to enhance the seal strength of bags made from tubular film similar to the foregoing exemplary three ply film have been aimed at adding an inside layer of thermoplastic material having sealing properties superior to that of ethylene vinyl acetate copolymer. However, a major problem that has been encountered in coextruding an inside sealing layer along with the ethylene vinyl acetate copolymer tubular substrate is that upon irradiatively cross-linking the substrate, the sealing layer is either cross-linked which elevates its softening point or degraded thereby diminishing its sealability. Thus, it is an object of the present invention to provide a sealing layer having sealing properties substantially uneffected during irradiative cross-linking treatment of an associated shrink layer.

Another problem encountered in finding an acceptable sealing layer for films such as the foregoing exemplary film relates to orientation of the film. It is commercially advantageous to orient film at temperatures near that of boiling water. A conflict is posed in identifing a sealing material capable of forming a relatively high temperature high strength seal but that does not unduly hamper orientation of ethylene vinyl acetate copolymer film at temperatures near that of boiling water. Thus, it is a further object of the invention to provide a high strength seaing layer for ethylene vinyl acetate copolymer multiply film but that permits development of shrink potential comparable to that of the foregoing prior art film at an orientation temperature near that of boiling water.

Of General interest is the disclosure of U.S. Pat. No. 4,207,363 for "Flexible Heat Shrinkable Multilayer Film for Packaging Primal Meat" issued June 10, 1980 to Lustig et al, directed to a multilayer film having a first outer layer of a blend of a propylene ethylene copolymer, a (butene-1)-ethylene copolymer, and a thermoplastic elastomer selected from the group consisting of ethylene-propylene copolymers and ethylene propylene diene terpolymers; a first core layer capable of being stretched during biaxial orientation of the multilayer film and comprising an extrudable adhesive; a second core layer serving as an oxygen barrier and being compatible to the biaxial orienting and heat shrinking of the film; and a second outer layer of an ethylene vinyl acetate copolymer; the multilayer film being biaxially oriented.

Of general interest is the disclosure of U.S. Pat. No. 4,276,330 for "Trilaminate Film For Forming Sideweld Bags" issued June 30, 1981 to Stanley et al, directed to sideweld bags made from trilaminate film having a core layer of ethylene-propylene block copolymer between surface layers of polypropylene or an ethylene-propylene random copolymer.

SUMMARY OF THE INVENTION

The present invention is directed to a sealing layer for multiply shrink film of ethylene vinyl acetate copolymers from which bags of relatively high seal strength may be made at enhanced production rates, but which does not unduly restrain orientation of such film at temperatures near that of boiling water. As an essential feature of the invention, the sealing properties of the sealing layer are not adversely affected during irradiative treatment of the film. Heat seals formed in making bags from the improved film demonstrate enhanced high temperature strength and grease resistance.

Accordingly, there is provided a multiply tubular shrink film comprising a first or inner sealing layer which comprises a propylene-ethylene random copolymer and a second or shrink layer melt bonded to said first layer which comprises an ethylene-vinyl acetate copolymer, further provided that the thickness of said second layer relative to the thickness of said first layer is sufficient such that the shrink temperature of the entire multilayer film, when oriented, is substantially controlled by the shrink temperature of said second layer. Preferably, the shrink layer is irradiatively cross-linked and the film is oriented.

In a preferred embodiment, there is provided in a multiply tubular film of the type having an inner shrink layer which comprises an irradiatively cross-linked ethylene vinyl acetate copolymer, a core barrier layer which comprises vinylidene chloride-vinyl chloride copolymer, and an outer abuse layer, the improvement comprising a sealing layer of a propylene ethylene random copolymer melt bonded inside said shrink layer. Preferably, the abuse layer comprises an ethylene vinyl acetate copolymer.

There is further provided a method for making a multiply tubular shrink film comprising coextruding a tubular first or sealing layer which comprises a propylene-ethylene random copolymer and a tubular second or shrink layer which comprises an ethylene vinyl acetate copolymer, further provided that the thickness of said second layer relative to the thickness of said first layer is selected as being sufficient such that the shrink temperature of the entire multiplayer film, when oriented, is substantially controlled by the shrink temperature of said second layer. Preferably, the method further includes irradiating said tubular film sufficient to cross-link said second layer.

DESCRIPTION OF THE PREFERRED EMBODIMENTS

A representative embodiment of the invention is a composite tubular film having the multilayer structure (inside) A/B/C/D (outside) where A is primarily a heat sealing layer, B is primarily a shrink layer, C is primarily a barrier layer, and D is primarily an abuse layer. A tubular film configuration is especially suited for bag making. The term "shrink layer" is intended to refer to the shrink controlling layer that initiates compatible shrinkage of the overall multilayer structure. Further discussion of this point is given below. The preferred embodiments of the invention can be made by a process similar to that described for the Brax patent, cited above, but differing fundamentally in that the substrate is coextruded in two layers rather than as a single layer. Specifically, in the first step of making the preferred film two extruders feed a single annular coextrusion die where the inner or first layer is a propylene-ethylene random copolymer having a minor amount of ethylene, representatively about 1–10% by weight and preferably about 3–5%. The outer layer or second layer of the tubular substrate is ethylene-vinyl acetate copolymer having about 8–25% or greater vinyl acetate content, preferably about 12%, and a melt flow of approximately 2. The second layer is representatively about twice as thick as the first layer and for example will be roughly 10 mils thick whereas the first layer will be roughly 5 mils thick. After cooling, the coextruded tube is flattened and then guided through an ionizing radiation field where, for example, it is festooned through the beam of an electron accelerator to receive a radiation dosage in the range of about 2 to 10 megarads (MR), preferably about 3 to 6 MR, more preferably about 4 to 5 MR. In general, irradiation should be sufficient to increase tensile strength of the shrink layer without substantially diminishing elongation properties. The dosage may be higher than 10 MR, but higher dosages do not necessarily improve properties. Irradiation by electrons to cross-link the molecules of polymeric material is generally well known in the art. As indicated above, the tubular film after irradiation is reinflated and then used as a substrate to which additional layers are joined followed by heating and stretch-orienting to form a tubular heat shrinkable film.

An essential feature of the invention is that the first or sealing layer comprising a propylene-ethylene random copolymer does not cross-link or observably degrade or consequently lose its sealing properties when irradiated with electrons. The first and second layers of the tubular substrate are coextruded together for melt bonding between the two and then irradiated to cross-link the material of the second layer preparatory to stretch orientation to impart shrink potential. Thus, an important problem is overcome with the invention by reconciling the apparently conflicting commercial objectives of providing a tubular film, the tubular configuration being advantageous for bag making, the tubular film having an irradiatively cross-linked ethylene-vinyl acetate shrink layer which is known to have commercially advantageous orientation and shrink temperature ranges below that of boiling water, while providing a melt bonded inside sealing layer of enhanced sealing properties which are not diminished during irradiative treatment of the shrink layer.

It is essential that the propylene-ethylene copolymer of the sealing layer be a random copolymer. The term "random copolymer" is used in the conventional sense to refer to a copolymer consisting of alternating segments of two monomeric units of random lengths, including single molecules. The purpose of this limitation in the present invention is that the sealing range of polypropylene is broadened to overlap the working temperature range of the ethylene-vinyl acetate shrink layer, but at the same time does not create a tendency of the propylene copolymer to cross-link in the presence of radiation which would unacceptably increase the viscosity of the sealing layer material during sealing at temperatures near that of boiling water. Another way of viewing this effect, is that as the randomness of the propylene-ethylene copolymer increases, crystallinity decreases thereby broadening the melt range of the random copolymer. Thus, in general the minor amount of ethylene added to randomize the copolymer will range from a lower ethylene content that is sufficient to disrupt crystallinity to the extent that the melt range of the random copolymer is sufficiently broadened to encompass ranges somewhat below that of boiling water, while the upper limit for the ethylene content is limited by the extent of randomness desired in that as ethylene content increases copolymerization will become generally less random and more of the block type, the block configuration tending to promote crystallinity (block alignment) and cross-linking in irradiation fields. Commercially available propylene-ethylene random copolymers are generally available with ethylene contents of about 1-5% and may be available up to 10% to a lesser extent. A representative random copolymer within the scope of the invention may be typically characterized as having a randomness index of roughly 0.5, as determined by the methodology disclosed in U.S. Pat. No. 4,325,365, a bulk density at 23° C. of about 0.9 grams/cc by ASTM D 1895-69 method C, a melt flow at 190° C. of about 1.7 grams/10 minutes, an ethylene content of about 5% by Perkin-Elmer infrared spectrophotometer standards, and a melting temperature of about 136° C.

In the second or shrink layer, the vinyl acetate content is relatively high and may range from about 8% to 25%, preferably about 12 to 20% with the orientation temperature generally decreasing and shrink capacity increasing as the vinyl acetate content of the ethylene-vinyl acetate copolymer increases. Also, as the vinyl acetate content in the shrink layer is increased, melt bonding between the first and second layers is enhanced. An alternative preferred mode for enhancing such melt bonding is to use a blend in the second layer of ethylene vinyl acetate copolymer, as above, with the random copolymer as in the sealing layer, the blend ratio by weight being preferably about 4 for example.

Next, a relatively gas impermeable (barrier) layer as a third layer is applied by inflating the foregoing tubular substrate, but not significantly stretching it, and then passing the inflated tubing through an extrusion coating die where the tubing receives a barrier coating of a copolymer of vinylidene chloride-vinyl chloride (generally saran). The preferred copolymer is a lightly plasticized copolymer of a mixture of 10% suspension polymerized and 90% emulsion polymerized copolymer. The emulsion polymerized copolymer consists of about 70% vinylidene chloride and 30% vinyl chloride and the suspension polymerized copolymer consists of about 80% vinylidene chloride and 20% vinyl chloride. In the preferred embodiment, the thickness of this vinylidene chloride-vinyl chloride copolymer layer will be in the range of 3.5 mils to 4.0 mils. The gas of main concern is oxygen and transmission is considered to be sufficiently low, i.e. the material is relatively gas impermeable, when the transmission rate is below 70 cc/m$^2$/mil thickness/24 hrs./atms. The multilayer film of the present invention has a transmission rate below this value. It is generally not desirable to irradiate the third layer when vinylidene chloride-vinyl chloride copolymer is used because of its tendency to degrade and discolor. This limitation accounts for irradiation of the tubular substrate rather than coextruding the entire multilayer film and then irradiating the entire film.

After receiving the vinylidene chloride-vinyl chloride copolymer layer, the coated tubing is fed through another coating die where it receives a fourth or abuse layer of about 6 mils, representatively, of ethylene-vinyl acetate copolymer having a vinyl acetate content of about 6%, representatively, and in general about 5-20%. Alternatively, the abuse layer may be coextruded with the barrier layer. Of course, this layer and the third layer will not have been irradiated. Alternatively, the outer abuse layer may be the same as the first or heat sealing layer, giving an overall multilayer structure of (inside) A/B/C/A (outside) which is appropriate for conventional form/fill/seal packaging situations wherein heat sealing is done on overlapped edge portions of a sheet of film.

The resin or basic polymeric materials fed into the extruders to make the tubular film of the present invention can be purchased from any of a number of suppliers, for example those identified in trade publications such as *Modern Plastics Encyclopedia.*

After the final layer has been applied, the tubular film is then cooled and collapsed afterwhich it is fed into a hot water tank having water at about 190°-205° F. to soften the film for orientation, then it passes through pinch rolls and is inflated into a bubble and stretched to a point where the film thickness is approximately 2 mils. Suitable thicknesses will range from about 1.0 to 4.0 mils. This will be the final thickness of the multilayer film of the preferred embodiment. As the bubble emerges from the hot water tank it cools rapidly in the air and then is collapsed and rolled up into flattened tubing. It is from this tubing of this final thickness that bags are made as described above. Representatively, bag making rates with the tubular film of the present invention are increased about 50% over rates practically attainable when using the foregoing exemplary prior art film.

The propylene-ethylene random copolymer for the sealing surface layer provides a layer which when sealed to itself to form a bag gives a strong seal. To adhere the first layer adequately to the second or shrink layer the two are coextruded so that the two layers are melt joined or bonded. The second layer is believed to control or initiate the shrinkage of the film, and the first and second layers compatibly shrink with each other. The second layer, which can be oriented at a lower temperature, namely, below the boiling point of water, will consequently shrink at a lower temperature. Propylene polymers have shrink temperatures significantly above 212° F. but when copolymerized with minor amounts of ethylene may be used to produce a composite which will also shrink below 212° F. when properly oriented. Thus, the coextruded combination of first and second layers when placed in a hot water bath will exhibit shrink properties compatible with those of ethylene-vinyl acetate copolymer. This is another surprising feature of the invention, i.e., that a film having a significant proportion of propylene polymer will shrink below the boiling point of water. The first layer is needed for its seal strength and high temperature strength but the higher shrink temperature of propylene polymers alone is not desired and is overcome by this combination of the first and second layers.

Within the scope of the invention, there is contemplated utility in the foregoing two layer tubular substrate for use either as a substrate generally or as a two-ply shrink film. Specifically, this generalized embodiment preferably includes a tubular inner or sealing layer which comprises a propylene-ethylene random copolymer; and a tubular outer or heat shrinkable layer melt bonded to the sealing layer which comprises an irradiatively cross-linked ethylene-vinyl acetate copolymer; further provided that the thickness of the outer layer relative to the thickness of the inner layer is sufficient such that the shrink temperature of the entire multilayer film, when oriented, is substantially controlled by the shrink temperature of the outer layer.

An exemplary three-ply structure using the substrate of the invention is 5%Et-PP/Blend/EVA(6%VA) where Blend is about 40% of EVA(9%VA) and about 40% of EVA(12%VA) and about 20% of 5%Et-PP, having representative multilayer dimensions of about 5/13/6 mils, respectively.

Exemplary four-ply structures, in accordance with the foregoing discussion, are (1) 5%Et-PP/EVA(12-%VA)/Saran/EVA(6%VA); (2) 5%Et-PP/EVA(12-%VA)/Saran/5%ET-PP; and (3) 5%Et-PP/Blend-/Saran/EVA(6%VA) where Blend is about 40% of EVA(9% VA) and 40% of EVA(12% VA) and 20% of 5%Et-PP. Representative extruded multilayer dimensions in each of these examples are 5.0/ 9.5/ 3.5/ 6.0 mils. As an indication of the favorable properties of these preferred film structures, the third such structure after being oriented from a hot water bath at 200° F. demonstrated a free shrink (ASTM D2732) at 185° F. over 4 seconds in the transverse direction of 34% and in the longitudinal direction of 25%, being comparable to the shrink properties of the exemplary prior art films discussed above. Bags made from this film were seal tested using a "variable pressure hot burst test" (VPHB), with and without grease applied to the seal area, which entails inflating the test bag to a pressure of about 10 inches water pressure, then immersing the heat seal area of the test bag in a hot water bath at 185° F., and after a 15 second waiting period smoothly increasing the air pressure within the test bag until the seal destructs. Test bags were produced at the 50% higher bag making rate, referred to above relative to bags made from the exemplary prior art film, which representatively had higher VPHB seal strengths by about 200% with grease and about 100% without grease.

Although the present invention has been described in conjunction with preferred embodiments it is to be understood that modifications and variations may be utilized without departing from the principles and scope of the invention, as those skilled in the art will readily understand. Accordingly, such modifications and variations may be practiced within the scope of the following claims.

What is claimed is:

1. A heat sealable bag made from a coextruded multiply tubular shrink film consisting essentially of:
    (a) a first or inner sealing layer which comprises (a) an irradiated, non-cross-linked propylene-ethylene random copolymer having an ethylene content of about 1–5%; and
    (b) a second or shrink layer melt bonded to said first layer which comprises a cross-linked ethylene-vinyl acetate copolymer having a vinyl acetate content in the range of 8–25%, further provided that the thickness of said second layer relative to the thickness of said first layer is sufficient such that the shrink temperature of the entire multilayer film, when oriented, is substantially controlled by the shrink temperature of said second layer, and further provided that said second layer has been irradiated to a dosage of 2–10 MR and comprising a blend of ethylene vinyl acetate copolymer as the major component, and the random copolymer of said first layer.

2. The tubular film of claim 1 wherein said blend components are blended in the ratio of about 4 to 1 by weight, respectively.

3. The tubular film of claim 1 wherein said vinyl acetate content is about 12% and said dosage is about 4–5 MR.

4. The tubular film of claim 1 wherein said abuse layer comprises the same material as said sealing layer.

5. The tubular film of claim 1 wherein said film is oriented and said sealing layer has a thickness of about 0.4 mils, said shrink layer has a thickness of about 0.8 mils, said barrier layer has a thickness of about 0.3 mils, and said abuse layer has a thickness of about 0.5 mils.

* * * * *